(12) United States Patent  
Wagner et al.

(10) Patent No.: US 6,676,144 B2
(45) Date of Patent: Jan. 13, 2004

(54) METHOD AND APPARATUS FOR SUSPENDING A VEHICULAR WHEEL ASSEMBLY

(75) Inventors: J. Todd Wagner, East Haven, CT (US); Avery Jutkowitz, Berkeley, CA (US)

(73) Assignee: Wagner Engineering, LLC, Rocky Hill, CT (US)

( * ) Notice: Subject to any disclaimer, the term of this patent is extended or adjusted under 35 U.S.C. 154(b) by 0 days.

(21) Appl. No.: 10/152,083

(22) Filed: May 20, 2002

(65) Prior Publication Data

US 2003/0067135 A1 Apr. 10, 2003

Related U.S. Application Data

(60) Provisional application No. 60/292,355, filed on May 21, 2001.

(51) Int. Cl.[7] ................................................. B60G 3/18
(52) U.S. Cl. ...................... 280/124.135; 280/124.143; 280/124.145
(58) Field of Search .................... 280/124.135, 124.143, 280/124.145

(56) References Cited

U.S. PATENT DOCUMENTS

| | | | |
|---|---|---|---|
| 2,162,067 A | | 6/1939 | Dreyer |
| 2,776,147 A | | 1/1957 | Bamford |
| 3,871,467 A | | 3/1975 | Senft et al. |
| 4,334,693 A | * | 6/1982 | Huber .................. 280/124.143 |
| 4,406,479 A | | 9/1983 | Chalmers |
| 4,456,282 A | * | 6/1984 | Rumpel .................. 280/124.13 |
| 4,616,847 A | * | 10/1986 | Kanai et al. .............. 280/5.504 |
| 4,709,935 A | * | 12/1987 | Takizawa et al. ........... 180/414 |
| 4,927,169 A | * | 5/1990 | Scaduto .................... 280/5.521 |
| 5,348,334 A | * | 9/1994 | Giltinan ................ 280/124.138 |
| 5,415,427 A | | 5/1995 | Sommerer et al. |
| 5,421,606 A | * | 6/1995 | Chun .................. 208/124.141 |
| 5,507,510 A | * | 4/1996 | Kami et al. ........... 280/124.136 |
| 5,758,898 A | * | 6/1998 | Gordon et al. ........ 280/124.106 |
| 5,821,434 A | * | 10/1998 | Halliday ................ 73/862.541 |
| 6,173,978 B1 | * | 1/2001 | Wagner ................ 280/124.128 |
| 6,305,700 B1 | * | 10/2001 | Bruehl ................ 280/124.135 |
| 6,467,783 B1 | * | 10/2002 | Blondelet et al. ..... 280/124.106 |

* cited by examiner

Primary Examiner—Lesley D. Morris
Assistant Examiner—Deanna Draper
(74) Attorney, Agent, or Firm—McCormick, Paulding & Huber LLP

(57) ABSTRACT

A suspension for and a method for suspending a vehicle having a body is provided. The suspension includes a first wheel assembly suspension and a second wheel assembly suspension. The first wheel assembly suspension extends between a first wheel assembly and the body. The first wheel assembly suspension includes an instant center. The second wheel assembly suspension extends between a second wheel assembly and the body. The second wheel assembly suspension includes an instant center. The first wheel assembly and the second wheel assembly are aligned so that a vertical centerline of each wheel assembly lies within a vertical plane that extends therebetween. In one embodiment, the instant center of each wheel assembly suspension is located within the vertical plane, below a roll center located within the vertical plane.

23 Claims, 4 Drawing Sheets

METHOD AND APPARATUS FOR SUSPENDING A VEHICULAR WHEEL ASSEMBLY

CROSS-REFERENCE TO RELATED APPLICATIONS

This application claims the benefit of U.S. Provisional Application No. 60/292,355, filed May 21, 2001, which is hereby incorporated by reference in its entirety. This application contains subject matter which is related to the subject matter of U.S. Pat. No. 6,173,978, issued Jan. 16, 2001 and U.S. Pat. No. 6,550,797, issued Apr. 22, 2003.

BACKGROUND OF THE INVENTION

1. Technical Field

This invention relates to vehicles in general, and to vehicular suspensions capable of controlling vehicle roll and pitch, in particular.

2. Background Information

The suspension of a vehicle determines the ride characteristics of the vehicle such as its roll and pitch. The term "roll" refers to rotational movement of the vehicle body about a longitudinal axis of the vehicle. Roll is typically encountered during cornering. The term "pitch" refers to rotational movement of the vehicle body about a widthwise axis of the vehicle. Pitch is typically encountered during acceleration (acceleration "squat") and during braking (braking "dive").

Vehicle suspension systems can be characterized as either active or passive. "Active" suspension systems typically adjust suspension elements during use in response to sensed operating conditions. Active suspension systems are often relatively complex, prohibitively expensive, or both. Passive suspension systems, on the other hand, typically include anti-roll or stabilizer bars, or the like that cannot be adjusted during use. Passive suspension systems are typically relatively simple and affordable.

In passive suspension systems that utilize elements such as springs and anti-roll bars to reduce cornering roll, there is a trade-off between reduction in roll and the smoothness of the ride. Spring and shock rates that increase the smoothness of the ride often counteract the effect of conventional anti-roll devices. Moreover, such anti-roll devices do not compensate for variations in weight distribution of the vehicle that can also significantly affect rolling characteristics.

What is needed, therefore, is a vehicular suspension system that provides favorable roll and pitch characteristics.

DISCLOSURE OF THE INVENTION

It is, therefore, an object to provide a vehicular suspension system that provides favorable roll and pitch characteristics.

According to the present invention, a suspension for a vehicle having a body is provided. The suspension includes a first wheel assembly suspension and a second wheel assembly suspension. The first wheel assembly suspension extends between a first wheel assembly and the body. The first wheel assembly suspension includes an instant center. The second wheel assembly suspension extends between a second wheel assembly and the body. The second wheel assembly suspension includes an instant center. The first wheel assembly and the second wheel assembly are aligned so that a vertical centerline of each wheel assembly lies within a vertical plane that extends therebetween. In one embodiment, the instant center of each wheel assembly suspension is located within the vertical plane, below a roll center located within the vertical plane.

According to a further aspect of the invention, a method for suspending a vehicle having a body is provided that includes the steps of: (1) providing a first wheel assembly suspension that extends between a first wheel assembly and the body, wherein the first wheel assembly suspension includes an instant center; (2) providing a second wheel assembly suspension that extends between a second wheel assembly and the body, wherein the second wheel assembly suspension includes an instant center; (3) aligning the first wheel assembly and the second wheel assembly so that a vertical centerline of each wheel assembly lies within a vertical plane that extends therebetween; and (4) positioning the first wheel assembly suspension and the second wheel assembly suspension so that the instant center of each wheel assembly suspension is located within the vertical plane, below a roll center located within the vertical plane.

An advantage of the present suspension is that it is possible to create a relatively high and stable roll center using the present suspension, and therefore a desirable stable vehicular suspension. The relatively high roll center can be maintained in approximately the same position during expected motion of the vehicle.

These and other objects, features, and advantages of the present invention will become apparent in light of the drawings and detailed description of the present invention provided below.

BRIEF DESCRIPTION OF THE DRAWINGS

FIG. 13 shows wheels having one-hundred percent Ackermann. FIG. 14 shows wheels having "neutral" Ackermann (also referred to as parallel orientation), and FIG. 15 shows wheels having reverse Ackermann.

DETAILED DESCRIPTION OF THE INVENTION

A vehicular suspension is described herein that can be used on a wide variety of different vehicular applications. The suspension is used with independently suspended wheel assemblies. The wheel assembly may be driven or non-driven. Consequently, the suspension can be used with rear wheel drive (RWD), front wheel drive (FWD), and all wheel drive (AWD) vehicles.

Figure 1:
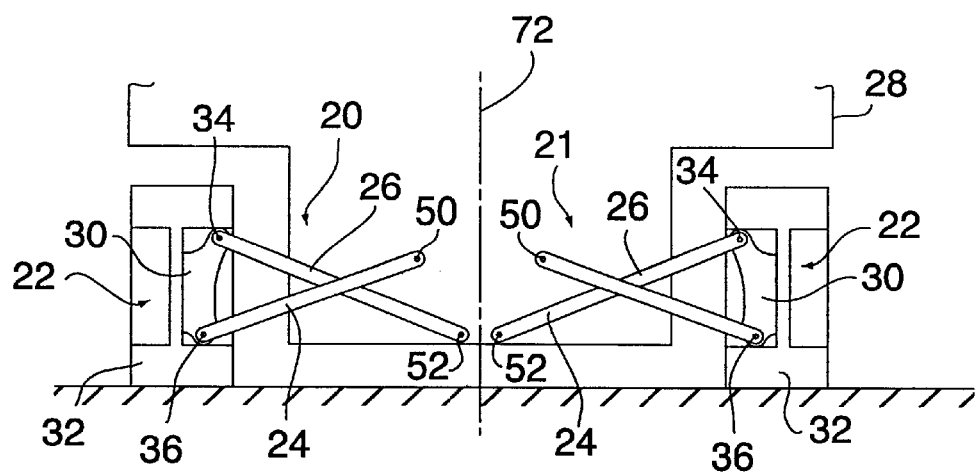
FIG. 1 is a diagrammatic front view of a vehicle showing the present suspensions.
Figure 2:
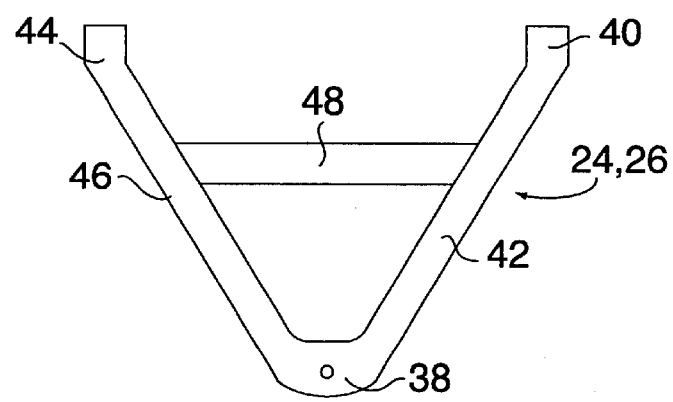
FIG. 2 is a diagrammatic view of a support arm used within the present suspension.

Referring to FIGS. 1 and 2, the present suspension 20,21 for a vehicular wheel assembly 22 includes a pair of support arms 24,26 extending between the body 28 of the vehicle and the wheel assembly 22. The terms "vehicle body" or "body of the vehicle" as used herein are defined as including the frame and chassis components attached thereto; e.g. sheet metal components, frame rails, doors, fenders, panels, interior, drivetrain, etc. In some vehicular applications, a subframe is coupled with structural components integrated into the sheet metal components of the vehicle in place of a conventional full frame. Other vehicular applications utilize a "unibody" style chassis that does not have an independent frame or subframe. Rather, all structural components are directly integrated into the sheet metal components of the vehicle. The present invention contemplates and is useful with all of these different types of vehicle bodies, and is not therefore limited to use with any one of the above.

The elements of the wheel assembly 22 will vary depending on the nature of the car (e.g., RWD, FWD, AWD) and in most instances also depend on the position of wheel assembly 22 on the vehicle. The wheel assembly 22 elements can be generally described as including a spindle 30 and a wheel (may also be referred to as a tire) 32. The spindle 30 includes an upper ball joint 34 and a lower ball joint 36. Rear suspensions do not typically include conventional ball joints, but rather include pivotable mount; e.g., bushings, etc. To simplify the description herein, the term "ball joint" is used herein, unless otherwise specified, to refer to any type of pivotal connection for connecting the support arm 24,26 to the spindle 30, including but not limited to, conventional ball joints, heim joints, bushings, etc. The wheel 32 is rotatably mounted on the spindle 30 in a manner known within the art.

Referring to FIG. 2, each support arm 24,26 includes a ball joint mount 38 (also referred to as a wheel assembly mount), a first body mount 40, a first member 42, a second body mount 44, and a second member 46. The first member 42 extends between the ball joint mount 38 and the first body mount 40. The second member 46 extends between the ball joint mount 38 and the second body mount 44. Some embodiments further include one or more lateral members 48 extending between the first and second members 42,46 to increase the rigidity of the support arm 24,26 and/or to provide an attachment point for additional suspension members (e.g., springs, shocks, etc.). The vehicle body 28 is pivotally attached to the support arm 24,26 at the first and second body mounts 40,44. In some instances, one or both body mounts 40,44 include a pliable bushing that provides a limited amount of motion in addition to rotational motion around a pivot axis extending between the body mounts 40,44. The ball joint mount 38 and the body mounts 40,44 in each support arm 24,26 define a plane. The first and second members 42,46 (and the lateral member(s) 48 if present) are not necessarily disposed in the plane of the support arm 24,26 of which they are a part, although they can be in some applications. The exact geometry of the first and second member 42,46 (and lateral member(s) 48) will vary to accommodate the application at hand.

Figure 3:
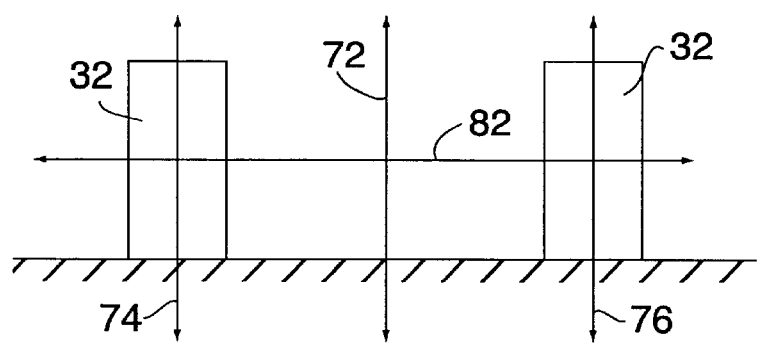
FIG. 3 is a diagram showing relative plane positioning.

Referring to FIGS. 1 and 3, the pair of support arms 24,26 extending between the body 28 of the vehicle and the wheel assembly 22 are arranged vis-à-vis the body 28 and the wheel assembly 22 such that one of the support arms 24 extends between the lower ball joint 36 and a pair of upper body mount connection points 50, and the other support arm 26 extends between the upper ball joint 34 and a pair of lower body mount connection points 52. The pair of upper body mount connection points 50 is disposed vertically above the pair of lower body mount connection points 52, although not necessarily in the same vertically extending plane, when the vehicle wheels 32 are in contact with or proximate the ground. The members 42,46 of one of the support arms 24,26 are received between the members 42,46 of the other support arm 26,24. Hence, the support arms 24,26 may be described as crossing one another in an "X" shaped arrangement, without normally touching one another.

The support arms 24,26 described above represent a preferred embodiment of the present invention, but do not represent all the possible embodiments of support arms 24,26. In alternative embodiments, one or both of the support arms 24,26 can be replaced with independent links that extend along paths similar to those of the above-described support arms 24,26; e.g., a pair of independent links, each including a ball joint mount 38 on one end and a body mount 40,44 on the opposite end. Independent links can be used in place of one or both of the support arms 24,26.

Figure 4:
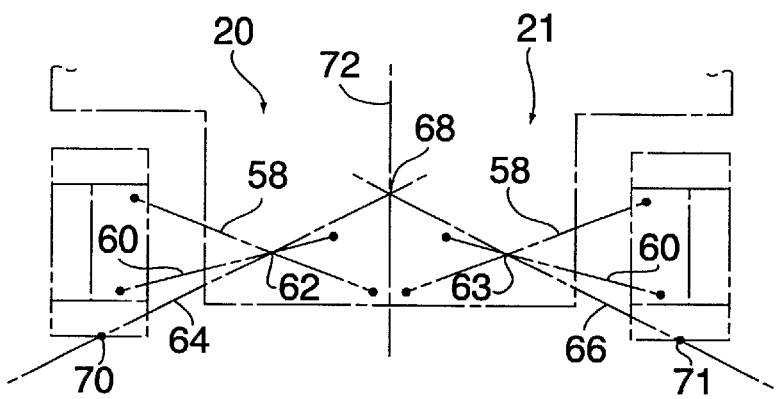
FIG. 4 is a diagram that illustrates the relationship of the support arm planes within a vertical transverse (or "widthwise") extending plane passing through the vertical centerline of the wheels.
Figure 5:
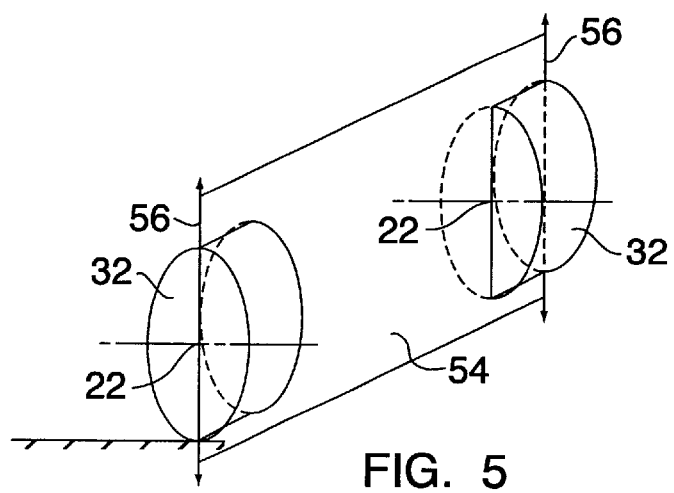
FIG. 5 is a diagram showing relative plane positioning.

FIG. 4 shows a diagram representing a symmetrical suspension arrangement, including a pair of wheel assembly suspensions 20,21, for a pair of wheel assemblies 22 each disposed on a side of the vehicle body 28 such as that shown in FIG. 1. The diagram is shown along a vertical plane 54 that passes through the vertical centerline 56 of both wheel assemblies 22. FIG. 5 shows the plane 54 in a perspective view to better illustrate the position of the plane 54 relative to the wheel assemblies 22. The lines 58,60 formed at the intersection of each support arm plane with the vertical plane 54 are shown in FIG. 4. Note that the support arm plane intersection lines 58,60 cross one another in each suspension 20,21 when viewed in this plane 54. The intersection point 62,63 of the lines 58,60 is defined as the instant center (IC) for the front elevation view of that suspension 20,21. FIG. 4 also shows a pair of lines 64,66 that intersect at the roll center 68 of the vehicle body 28. One line 64 passes through the center of the tire ground contact patch 70 and the IC 62 on one side of the vehicle body 28. The other line 66 passes through the center of the tire ground contact patch 71 and the IC 63 on the opposite side of the vehicle body 28.

The vertical position of the roll center 68 relative to the center of gravity of the vehicle body 28 is significant because it affects the roll of the vehicle. The position of the roll center 68 can be adjusted by altering the relative positioning of the support arms 24,26 on either or both sides of the vehicle, and thereby alter the position of the IC 62,63 which is defined by the planes of the support arms 24,26. An advantage provided by the present suspension is that it is possible to create a relatively high and stable roll center 68 using a pair of the present suspensions; i.e., a relatively high roll center than can be maintained in approximately the same position during expected motion of the vehicle. It should also be noted that the roll center shown in FIG. 4 is intersected by the vertical centerline 72 of the vehicle body 28. The roll center 68 intersects the centerline 72 because the suspensions on each side of the vehicle body 28 are symmetrical with one another. In some instances there is advantage to making the suspensions non-symmetrical and thereby cause the roll center 68 to be disposed on one side of the vehicle centerline 72. In addition, under certain loading or body movement conditions, the roll center 68 may move to either side of the vehicle centerline 72.

Figure 6:
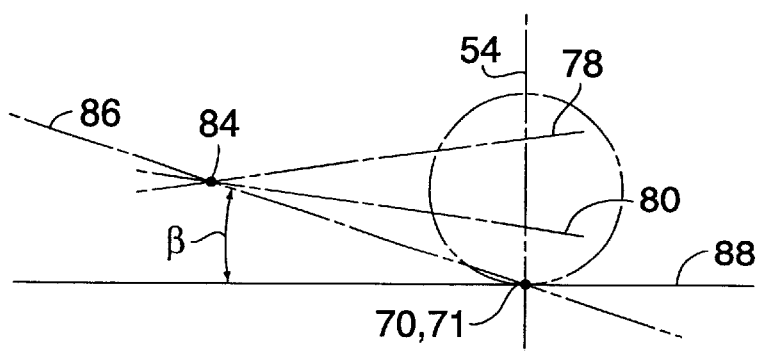
FIG. 6 is a diagram that illustrates the relationship of the support arm planes within a longitudinally extending plane passing through the vertical centerline of the wheel.

Referring to FIG. 6, the orientation of the support arm planes for a wheel suspension 20,21 also has important implications relative to other suspension parameters such as anti-dive, anti-squat, and anti-lift; i.e., suspension characteristics in the fore and aft direction of the vehicle (also referred to as "pitch"). FIG. 6 diagrammatically shows a side-view of a wheel assembly 22. The view is shown along a longitudinal vertical plane 74,76 that passes through the centerline of the wheels 32 on one side of the vehicle body (see FIG. 3). In FIG. 6, the wheel 32 outline is shown in phantom to locate the other elements of the drawing. The lines 78,80 formed by the intersection of the support arm planes with the plane 74,76 passing through the centerline of the wheels 32 on that side of the vehicle body 28 illustrate an embodiment where the support arm planes are not parallel to a horizontal plane 82 (see FIG. 3). The lines 78,80 can be extended to a convergence point 84 that is the instant center of the suspension 20,21 in the side view. A line 86 extending between the side view IC 84 and the center of the tire contact patch 70,71 on the ground forms an angle $\beta$ with a horizontally extending line 88 that passes through the widthwise plane 54 extending through the centerline of the wheels 32. The tangent of the angle $\beta$ is directly related to the anti-dive, anti-lift, or anti-squat of the vehicle wheel assembly 22 being considered. Increasing or decreasing the magnitude of the angle $\beta$ enables the adjustment of the anti-dive, anti-squat, or anti-lift to be suited to the application. The present suspension 20,21 facilitates the positioning of the convergence point 84 vertically and horizontally and thereby enables the use of a variety of advantageous $\beta$ angle's for various vehicular applications. The convergence point 84 can also be positionally described in terms of a side view swing arm (svsa) height and length. The svsa height represents either: 1) the difference in vertical distance between the horizontal line 88 aligned with the wheel contact and the IC 84; or 2) the difference in vertical distance between the horizontal plane passing through the centerline of the wheel assembly and the IC. Which svsa height is appropriate depends on the position of the wheel assembly, whether it is driven, etc. The methodology to determine which is used is known and will therefore not be discussed further herein. The svsa length is the distance between the vertical centerline of the wheel assembly and the IC.

Figure 7:
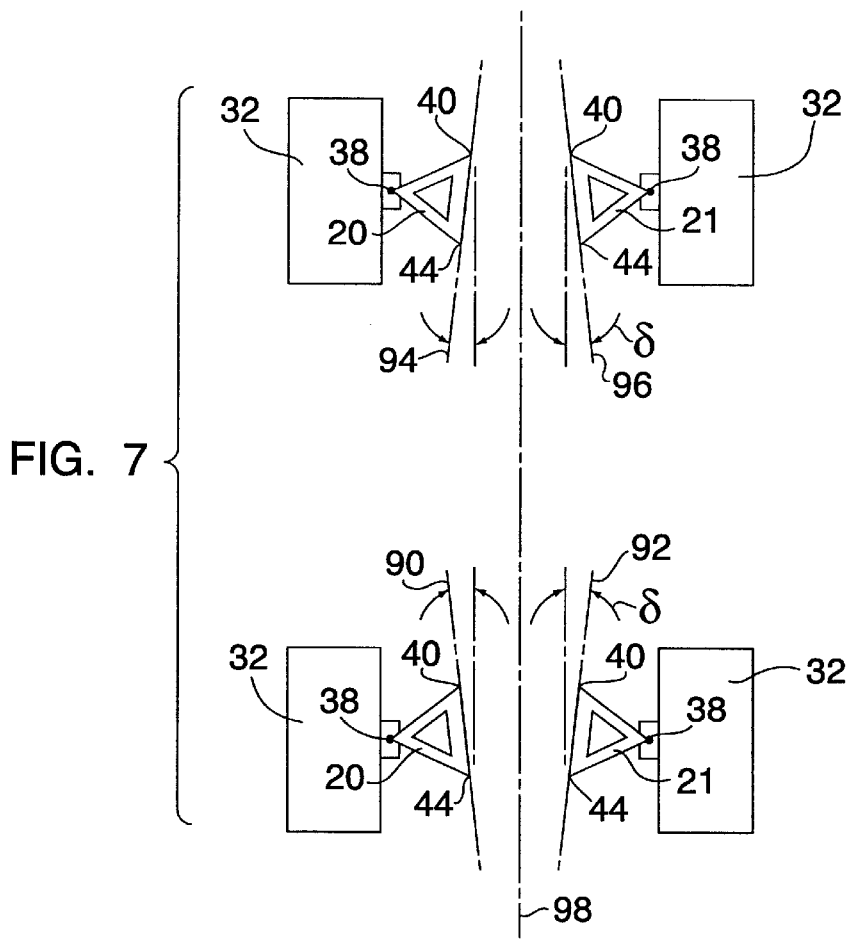
FIG. 7 is a diagrammatic top view of a vehicle illustrating the orientation of the body mount lines of the present suspension relative to a longitudinally extending line.

Referring to FIG. 7, the body mount line 90,92,94,96 of each support arm 24,26 can also be skewed from the longitudinally extending vertical axis 98 by an angle $\gamma$. The body mount line 90,92,94,96 is defined as a line that extends between the two body mounts 40,44 of the support arm 24,26. FIG. 7 diagrammatically shows the wheel suspensions 20,21 of a vehicle in a horizontal plane to illustrate the angle $\gamma$ extending between the body mount line 90,92,94,96 of each suspension 20,21 and a longitudinal line parallel to axis 98. The suspensions 20,21 shown in FIG. 7 are all skewed by the angle $\delta$. The exact amount of skew can vary to suit the application at hand and need not be similar between suspensions 20,21; e.g., front and rear wheel suspensions 20,21 having different skew angles, or between side to side suspensions 20,21 having different skew angles. The ability of the present suspension to be skewed from the longitudinal axis 98 of the vehicle makes it advantageously adaptable to a variety of vehicular applications.

Figure 8:
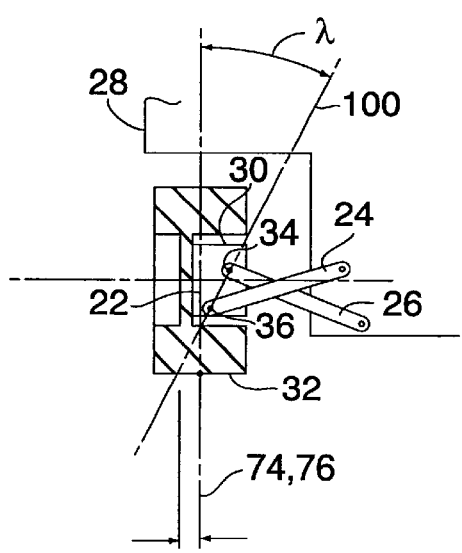
FIG. 8 is a diagrammatic elevation view of the present suspension illustrating the position of the ball joint mounts relative to the wheel assembly.

Referring to FIG. 8, the crossed orientation of the support arms 24,26 within the present suspension facilitates positioning the ball joint mounts 34,36 relative to the wheel 32. Historically, the spindle 30 of a wheel assembly 22 pivoted about a solid axle known as a "kingpin". Later improvements replaced the kingpin with ball joints. The line 100 between the two pivot points 34,36 is still, however, referred to as the kingpin axis (or wheel assembly mount line). As can be seen in FIG. 8, the kingpin axis 100 passing through the ball joint mounts 34,36 of the support arms 24,26 forms an angle $\lambda$ relative to the vertical centerline (disposed within plane 74,76 as diagrammatically shown in FIG. 3) of the wheel 32. In some instances, the kingpin axis 100 may be parallel to the vertical centerline 74,76 of the wheel 32 (zero degree angle –0°). In other instances, the angle between the kingpin axis 100 and the vertical centerline 74,76 is greater than zero and the kingpin axis 100 can therefore be described as extending toward (or away from) the vertical centerline 74,76. The angle of the kingpin axis 100 relative to the vertical centerline 74,76, and the position where the kingpin axis 100 intersects the vertical centerline 74,76, are both significant because of the effects they have relative to the scrub radius of the wheel 32 and the length of the spindle 30. The crossed orientation of the support arms 24,26 within the present suspension 20,21 enables the ball joint mount 38 from each support arm 24,26 to be positioned relatively close to the vertical centerline 74,76 of the wheel 32.

Figure 9:
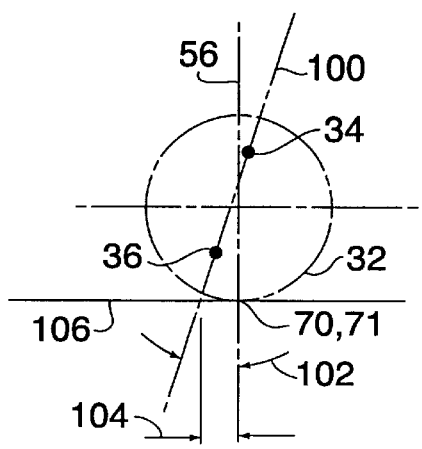
FIG. 9 is a diagram that illustrates the relationship of the kingpin axis and the wheel assembly so that the positionability of the kingpin axis possible with the present suspension can be fully appreciated.

Referring to FIG. 9, the crossed orientation of the support arms 24,26 within the present suspension 20,21 also provides favorable positionability of the ball joint mounts 38 vis-a-vis the caster angle and the trail of the kingpin axis 100. The caster angle 102 refers to the angle of the kingpin axis 100 relative to the vertical centerline 56 of the wheel assembly 22 (or wheel 32) in the side-view of the wheel 32. The trail 104 refers to the distance between the vertical centerline 56 of the wheel 32 and the point of intersection 106 between the kingpin axis 100 and the horizontal plane 106 containing the contact patch 70,71 of the wheel 32.

Figure 10:
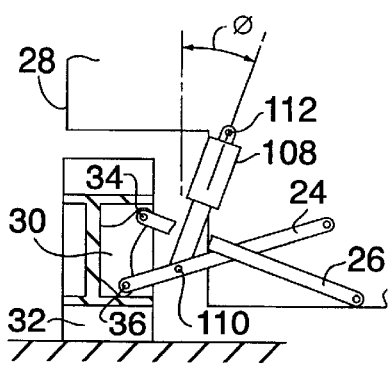
FIG. 10 is a diagrammatic view of an embodiment of the present suspension that includes a spring assembly.
Figure 11:
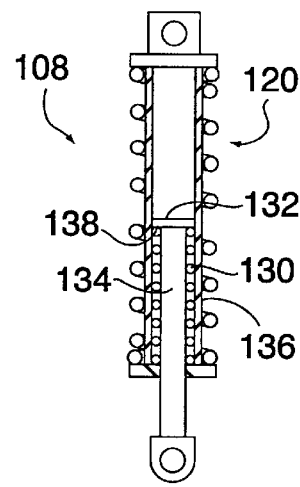
FIG. 11 is a diagrammatic view of a spring assembly embodiment that can be used with the present invention suspension.
Figure 12:
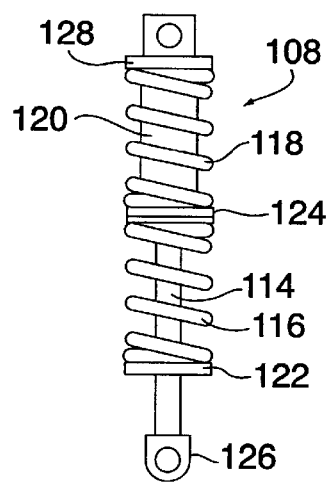
FIG. 12 is a diagrammatic view of a spring assembly embodiment that can be used with the present invention suspension.

Referring to FIGS. 10–12, the present suspension 20,21 utilizes a spring assembly 108 that extends between, and is pivotally attached to, one of the support arms 24,26 (or spindle 30) and the vehicle body 28. FIG. 10 shows the spring assembly 108 attached to the support arm 24 that is pivotally attached to the lower ball joint 36, but in alternative embodiments the spring assembly 108 could be attached to the other support arm 26. In one embodiment, the spring assembly 108 is a coil over shock that includes a load bearing spring and a shock absorber. A coil spring may also be mounted independently of a shock absorber. In addition, a torsion bar may be used with or in place of a coil spring. The spring assembly 108 is mounted so that the assembly is skewed at an angle $\phi$ of approximately fifteen degrees from vertical when the wheel 32 is a normal ride height. Skewing the spring assembly 108 in this manner with the geometry of the present suspension 20,21 creates a favorable wheel load rate characteristic. Specifically, the wheel load rate decreases as the wheel 32 travels upward, in the direction toward the vehicle body 28. This occurs because the vertical component of the force transmitted through the spring assembly 108 decreases as the lower attachment point 110 of the spring assembly 108 rotates upward with the wheel 32, while the spring assembly 108 pivots about its upper pivot point 112. In some instances, more than one spring assembly is utilized, extending between the vehicle body 28 and one of the support arms 24,26 in a manner similar to that described above. The additional spring assemblies 108 may or may not include a shock absorber.

Referring to FIG. 11, in some embodiments, the spring assembly 108 includes a rebound spring 130 disposed within the shock absorber 120 that acts between the rod end 132 of the shock absorber piston 134 and the housing 136 of the shock. The rebound spring 130 is not attached to the piston 134 and therefore only acts in compression for a portion of the rod travel within the shock housing 136 beyond a predetermined engagement point 138. In circumstances where wheel assembly 22 (and therefore suspension 20,21) travel causes the spring assembly 108 to extend beyond the engagement point 138 (i.e., below "normal ride height"), the rebound spring 130 compresses and thereby opposes the travel of the suspension 20,21 and attached wheel assembly 22. In circumstances where the wheel assembly travel causes the spring assembly 108 to compress above the engagement point 138 (i.e., above normal ride height), the rebound spring 130 is not engaged and consequently has no effect on the travel of the suspension 20,21 and attached wheel assembly 22.

Referring to FIG. 12, in another embodiment, the spring assembly 108 includes a center shaft 114, a first spring 116, and a second spring 118. The spring assembly 108 further includes an additional motion damper 120. The center shaft 114 is received within the first and second springs 116,118 and the motion damper 120 is attached to the center shaft 114. Acceptable motion dampers 120 include, but are not limited to, a gas or liquid type shock absorber. The first spring 116 extends between a first end spring flange 122 and a center spring flange 124. The first end spring flange 122 is either fixed to the center shaft 114 or is travel-limited by a first stop attached to the center shaft 114. In either case, the first stop prevents the first end spring flange 122 from traveling further toward the adjacent end 126 of the spring assembly 108. The second spring 118 extends between the center spring flange 124 and a second end spring flange 128. A second stop attached to the outer body of the motion damper 120 (or other member similarly fixed) limits the travel of the center spring flange 124 and therefore the second spring 118 in the direction toward the first spring 116. The spring assembly 108 shown in FIG. 11 shows the second spring 118 disposed around the periphery of the motion damper 120.

In an uninstalled condition (or if the vehicle is lifted and the wheel assembly 22 is allowed to extend to its fully extended position), the first spring 116, which acts on and between the first end spring flange 122 and the center spring flange 124, is preferably only lightly loaded. The second spring 118, which acts on and between the second end spring flange 128 and the center spring flange 124, is preferably pre-loaded in compression by an amount appropriate for the application at hand. As the spring assembly 108 is loaded, only the first spring 116 will compress until the force provided by the first spring 116 equals or exceeds the initial pre-loaded force of the second spring 118. When only the first spring 116 is compressing, the spring assembly 108 acts as thought the first spring 116 is the only spring present; i.e., a single spring system. When the force of the first spring 116 exceeds the initial pre-loaded force of the second spring 118, the force of each spring 116,118 will equal and each spring will compress some amount. The exact amount either spring 116,118 will compress will depend on the spring rate of the particular spring. Under these conditions, the spring assembly 108 acts as though it is a twin spring system where the springs 116,118 are acting in series. As such, the center spring flange 124 can be described as floating between the first and second springs 116,118. If, for example, the first and second springs 116,118 are identical four hundred pound springs, the spring assembly 108 will initially act as though it is a single four hundred pound spring system. When the force of the first spring 116 equals that of the second spring 118, however, the spring assembly 108 will begin to act as a two spring in series system. As a result, the effective spring force of the first and second springs 116,118 acting in series will be equal to approximately one half of one of the springs acting independently; i.e., two hundred pounds.

The spring assembly 108 acts as a load path between vehicle body 28 and the suspension support arms 24,26, and ultimately between the vehicle body 28 and the wheel 32 since the four wheels 32 support the entire weight of the vehicle. The spring assembly 108 can be mounted in a variety of positions, but is preferably mounted in such a manner that the centerline of the spring assembly 108 is skewed from a vertically extending line by an angle φ as described above. The attachment points of the spring assembly 108 and the relative positions of the body mounts 40,44 and ball joint mount 38 of the support arm 24,26 to which the spring assembly 108 is attached will define the arcuate path of travel possible for the wheel assembly 22. The geometry of the present suspension support arms 24,26, the orientation of the spring assembly 108 relative to the support arm 24,28 and the vertical plane, and the twin spring characteristics of the spring assembly 108 enable the spring assembly 108 to provide a diminishing load rate to the wheel assembly 22, and therefore the wheel 32 to the ground, as the spring assembly 108 is compressed past an equilibrium point.

Figures 13, 14, 15:
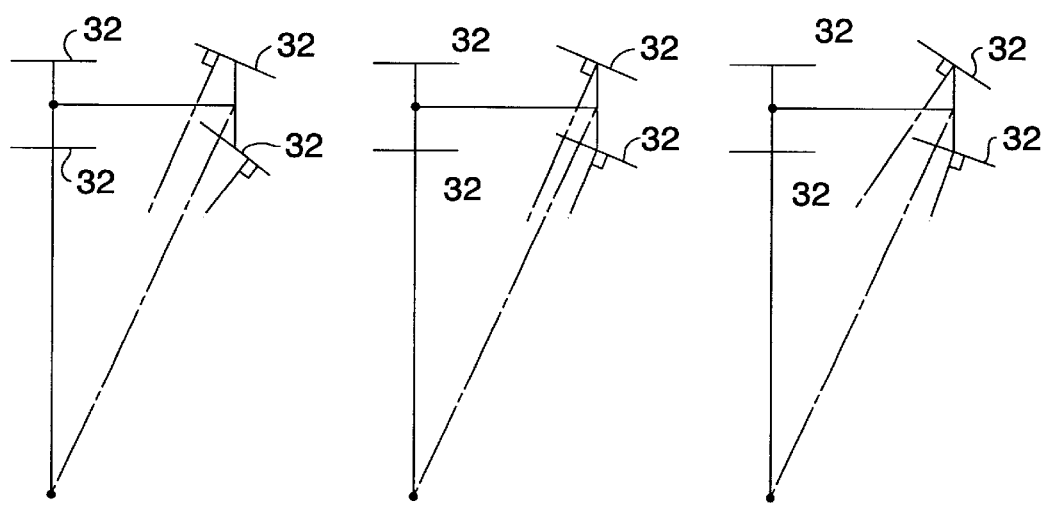
FIGS. 13–15 are diagrams illustrating Ackermann steering geometry between the front wheels of a vehicle.

Referring to FIGS. 12–14, it is known to use Ackermann to account for the difference in turning radius between the vehicle wheel 32 (shown diagrammatically) disposed along the inner radius track in a turn and the vehicle wheel 32 disposed along the outer radius track. It is also known that turning can produce lift on the vehicle body. The amount of Ackermann created by the front suspension when the steering wheel is turned can be used to counteract the lift produced on the vehicle 28 body during the turn. For example, increasing the Ackermann can produce anti-lift. The support arms 24,26 of the present wheel assembly suspension 20,21 facilitate the creation of Ackermann because of their positionability relative to the vehicle body 28.

Although this invention has been shown and described with respect to the detailed embodiments thereof, it will be understood by those skilled in the art that various changes in form and detail thereof may be made without departing from the spirit and scope of the invention. For example, FIG. 1 shows a diagrammatic front view of a vehicle having a pair of the present suspensions 20,21. The support arms 24,26 of those suspensions are symmetrical and do not cross the centerline 72 of the vehicle. In alternative embodiments, the support arms 24,26 of one or both suspensions 20,21 may cross the centerline 72, and potentially cross each other. Extending the support arms 24,26 can provide favorable camber characteristics for a wheel assembly 22.

What is claimed is:

1. A suspension for a vehicle having a body, the suspension comprising:
   a first wheel assembly suspension that extends between a first wheel assembly and the body, wherein the first wheel assembly suspension includes an instant center;

a second wheel assembly suspension that extends between a second wheel assembly and the body, wherein the second wheel assembly suspension includes an instant center;

wherein the first wheel assembly and the second wheel assembly are aligned so that a vertical centerline of each wheel assembly lies within a vertical plane that extends therebetween;

wherein the instant center of each wheel assembly suspension is located within the vertical plane, below a roll center located within the vertical plane;

wherein the first wheel assembly suspension and the second wheel assembly suspension each comprise a first support arm and a second support arm;

the first support arm having a first wheel assembly mount and a pair of first body mounts, wherein a first support arm plane is defined by the first wheel assembly mount and the first body mounts;

the second support arm having a second wheel assembly mount and a pair of second body mounts, wherein a second support arm plane is defined by the second wheel assembly mount and the second body mounts; and wherein one of said the first support arm and the second support arm comprises a first member that extends between the first wheel assembly mount and one of the first body mounts; and a second member that extends between the first wheel assembly mount and the other of the first body mounts; and a lateral member extends between the first member and the second member.

2. The suspension of claim 1, wherein the first support arm and the second support arm are positioned such that the first support arm plane intersects the vertical plane along a first line, and the second support arm plane intersects the vertical plane along a second line, and the first line and second line cross each other at the instant center.

3. The suspension of claim 2, wherein each wheel assembly supports a tire that has a ground contact patch with a center, and wherein the roll center is located within the vertical plane at an intersection of a first line and a second line;

wherein the first line extends through the center of the ground contact patch of the tire supported by the first wheel assembly and the instant center of the first wheel assembly suspension; and wherein the second line extends through the center of the ground contact patch of the tire supported by the second wheel assembly and the instant center of the second wheel assembly suspension.

4. The suspension of claim 3, wherein the second support arm comprises:

a first member that extends between the second wheel assembly mount and one of the second body mounts; and a second member that extends between the second wheel assembly mount and the other of the second body mounts.

5. The suspension of claim 4, wherein the second support arm further comprises a lateral member extending between the first member and the second member.

6. The suspension of claim 2, wherein the first support arm plane intersects a longitudinally extending plane that passes through a centerline of a tire supported by the first wheel assembly along a third line; and wherein the second support arm plane intersects the longitudinally extending plane along a fourth line; and wherein the third and fourth lines are skewed and converge at a point located within the longitudinally extending plane.

7. The suspension of claim 2, wherein a first body mount line extends through the pair of first body mounts and a second body mount line extends through the pair of second body mounts; and wherein the first body mounts are attached to the body such that the first body mount line is skewed by a first angle from a longitudinally extending centerline of the vehicle.

8. The suspension of claim 7, wherein the second body mounts are attached to the body such that the second body mount line is skewed by a second angle from the longitudinally extending centerline of the vehicle.

9. The suspension of claim 8, wherein the first angle and the second angle are equal.

10. The suspension of claim 2, wherein a first wheel assembly mount line extends through the first wheel assembly mount and the second wheel assembly mount of the first wheel assembly suspension, and a second wheel assembly mount line extends through the first wheel assembly mount and the second wheel assembly mount of the second wheel assembly suspension;

wherein at least one of the first wheel assembly mount line and the second wheel assembly mount line is skewed from a vertical centerline of a tire attached to the respective first wheel assembly and second wheel assembly.

11. The suspension of claim 2, wherein the first wheel assembly suspension and the second wheel assembly suspension each further comprise:

a spring assembly having a first end pivotally attached to one of the first support arm, the second support arm, or spindle, and a second end pivotally attached to the body;

wherein each spring assembly provides a changing load rate to the wheel assembly as the spring assembly is compressed.

12. The suspension of claim 11, wherein the spring assembly comprises a shock absorber received within a coil spring.

13. The suspension of claim 11, wherein the spring assembly comprises a rebound spring.

14. A suspension for a wheel assembly of a vehicle having a body, the suspension comprising:

a first support arm having a first wheel assembly mount and a pair of first body mounts, and a first support arm plane defined by the first wheel assembly mount and the first body mounts;

a second support arm having a second wheel assembly mount and a pair of second body mounts, and a second support arm plane defined by the second wheel assembly mount and the second body mounts;

wherein the first wheel assembly mount is pivotally attached to the wheel assembly at an upper wheel assembly point, and the second wheel assembly mount is pivotally attached to the wheel assembly at a lower wheel assembly point, and the first body mounts are pivotally attached to the body at a pair of lower body points, and the second body mounts are attached to the body at a pair of upper body points, and the first support arm and the second support arm thereby cross each other;

wherein the first support arm plane intersects a longitudinally extending plane that passes through a centerline of a tire supported by the first wheel assembly along a first line;

wherein the second support arm plane intersects the longitudinally extending plane along a second line; and wherein the first and second lines are skewed and converge at a point located within the longitudinally extending plane.

15. The suspension of claim 14, wherein a first body mount line extends through the pair of first body mounts and a second body mount line extends through the pair of second body mounts; and wherein the first body mounts are attached to the body such that the first body mount line is skewed by a first angle from a longitudinally extending centerline of the vehicle.

16. The suspension of claim 15, wherein the second body mounts are attached to the body such that the second body mount line is skewed by a second angle from the longitudinally extending centerline of the vehicle.

17. The suspension of claim 16, wherein the first angle and the second angle are equal.

18. The suspension of claim 14, wherein a wheel assembly mount line extends through the first wheel assembly mount and the second wheel assembly mount;

wherein the wheel assembly mount line is skewed from a vertical centerline of a tire attached to the wheel assembly.

19. A method for suspending a vehicle having a body, comprising the steps of:

providing a first wheel assembly suspension that extends between a first wheel assembly and the body, wherein the first wheel assembly suspension includes an instant center;

providing a second wheel assembly suspension that extends between a second wheel assembly and the body, wherein the second wheel assembly suspension includes an instant center;

aligning the first wheel assembly and the second wheel assembly so that a vertical centerline of each wheel assembly lies within a vertical plane that extends therebetween;

positioning the first wheel assembly suspension and the second wheel assembly suspension so that the instant center of each wheel assembly suspension is located within the vertical plane, below a roll center located within the vertical plane;

wherein the first wheel assembly suspension and the second wheel assembly suspension each comprise a first support arm and a second support arm;

the first support arm having a first wheel assembly mount and a pair of first body mounts, wherein a first support arm plane is defined by the first wheel assembly mount and the first body mounts;

the second support arm having a second wheel assembly mount and a pair of second body mounts, wherein a second support arm plane is defined by the second wheel assembly mount and the second body mounts;

wherein the first support arm and the second support arm are positioned such that the first support arm plane intersects the vertical plane along a first line, and the second support arm plane intersects the vertical plane along a second line, and the first line and second line cross each other at the instant center;

wherein the first support arm plane intersects a longitudinally extending plane that passes through a centerline of a tire supported by the first wheel assembly along a third line, and the second support arm plane intersects the longitudinally extending plane along a fourth line; and skewing the third and fourth lines so that they converge at a point located within the longitudinally extending plane.

20. The method of claim 19, further comprising the steps of:

providing a tire on each wheel assembly, wherein the tire that has a ground contact patch with a center, and wherein the roll center is located within the vertical plane at an intersection of a first line and a second line;

wherein the first line extends through the center of the ground contact patch of the tire supported by the first wheel assembly and the instant center of the first wheel assembly suspension; and wherein the second line extends through the center of the ground contact patch of the tire supported by the second wheel assembly and the instant center of the second wheel assembly suspension.

21. The method of claim 19, further comprising:

wherein a first body mount line extends through the pair of first body mounts and a second body mount line extends through the pair of second body mounts; and attaching the first body mounts to the body such that the first body mount line is skewed by a first angle from a longitudinally extending centerline of the vehicle.

22. The method of claim 21, further comprising the step of:

attaching the second body mounts to the body such that the second body mount line is skewed by a second angle from the longitudinally extending centerline of the vehicle.

23. The method of claim 19, further comprising:

wherein a first wheel assembly mount line extends through the first wheel assembly mount and the second wheel assembly mount of the first wheel assembly suspension, and a second wheel assembly mount line extends through the first wheel assembly mount and the second wheel assembly mount of the second wheel assembly suspension;

skewing at least one of the first wheel assembly mount line and the second wheel assembly mount line from a vertical centerline of a tire attached to the respective first wheel assembly and second wheel assembly.

* * * * *